INVENTOR.
WALTER LANGFORD
BY Alexander Riaboff
ATTORNEY

May 30, 1950 W. LANGFORD 2,509,569
FRUIT CATCHER
Filed July 16, 1948 2 Sheets-Sheet 2

INVENTOR.
WALTER LANGFORD
BY Alexander Riaboff
ATTORNEY

Patented May 30, 1950

2,509,569

UNITED STATES PATENT OFFICE 2,509,569

FRUIT CATCHER

Walter Langford, Graton, Calif.

Application July 16, 1948, Serial No. 39,127

2 Claims. (Cl. 56—329)

This invention relates to a foldable fruit collector and has for its object to provide an improvement on a device shown in my Patent No. 2,350,908.

Another object of this invention to provide a foldable fruit collector which can be easily assembled around a tree, folded up for the purpose of moving and setting up around another tree.

Another object of my invention to provide a foldable fruit collector which is simply in construction, light and compact when folded, and can be easily handled by one man.

Other objects and advantages will appear as the specification proceeds and the novel features of the device will be particularly pointed out in the claims hereto annexed.

In this specification and the annexed drawing, the invention is illustrated in the form considered to be the best, but it is understood, that the invention is not limited to such form; and it is also to be understood that in and by the claims following the description, it is desired to cover the invention in whatsoever form it may be embodied.

My invention is illustrated in the accompanying drawing in which.

Figure 1:
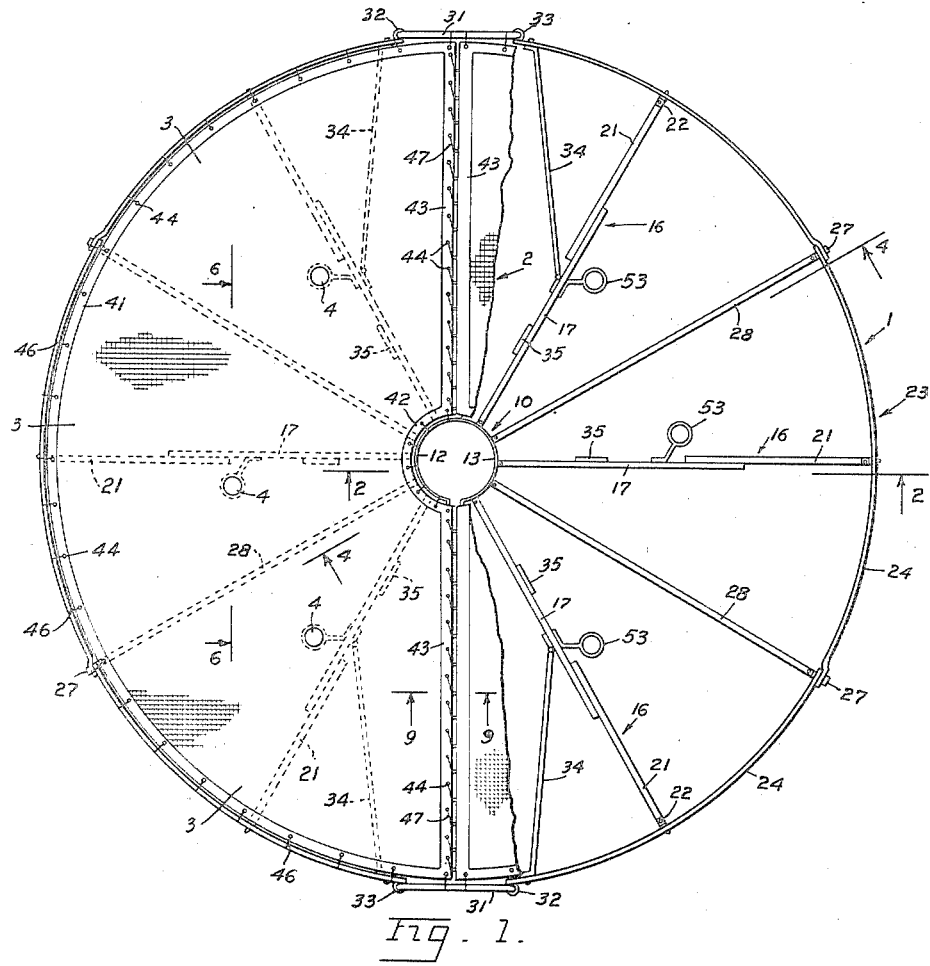
Fig. 1 is a plan view of the device with some of the covering removed.
Figure 2:
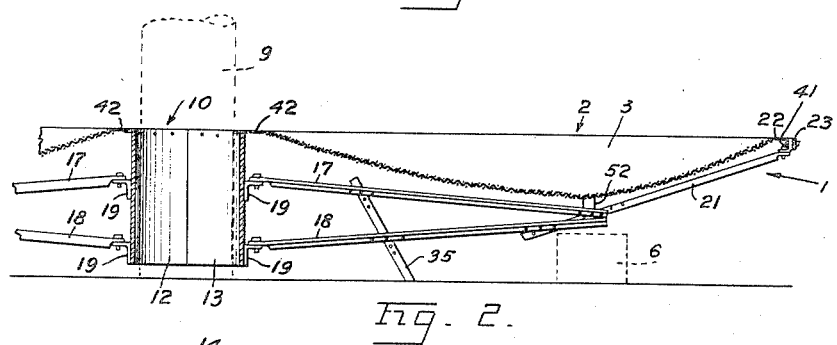
Fig. 2 is a cross-section on the line 2—2 of Fig. 1.
Figure 3:
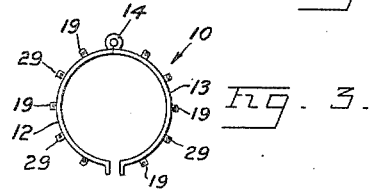
Fig. 3 is a plan view of a collar.
Figure 4:
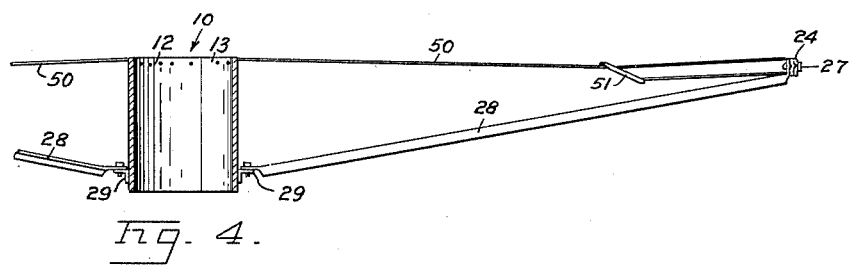
Fig. 4 is a cross-section taken on the line 4—4 of Fig. 1.
Figure 7:
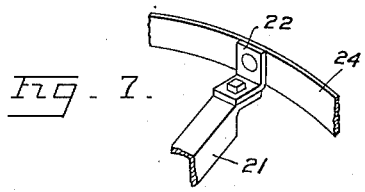
Fig. 7 is a perspective view of the connection between a rib and a ring.
Figure 8:
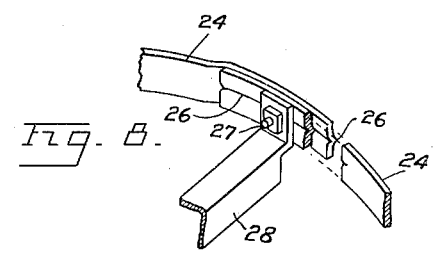
Fig. 8 is a perspective view of the connection between a brace and a ring.

In detail my device consists of a circular frame 1 supporting a cover 2 which covers said frame. The cover 2 is arranged in a plurality of radial hoppers 3, each having an outlet 4 at the lowermost point thereof. A fruit falling on said cover 2 will land in one of the hoppers 3 and will roll downwardly to the outlet 4 and therethrough into a box 6, provided thereunder.

A frame 1 consists of a collar 10 which is placed around a trunk 11 of a fruit tree 9. The collar 10 is split into two halves 12 and 13 which are connected by a hinge 14 and have the other ends free. Each half carries a plurality of ribs 16 each of which comprises a pair of bars 17 and 18 swingably secured to angle 19, the latter being riveted to the collar 10. The free ends of said bars 17 and 18 come to a point and are intersected at an angle by an outer bar 21 extending from said bars 17 and 18 outwardly and upwardly. The outer end of said outer bar 21 is swingably attached to an angle 22 by means of a suitable bolt, or a rivet. The angle 22 is riveted to a ring 23. The latter consists of a plurality of ring sections 24 in form of arcuated bars each section being attached to a corresponding rib 16. The ends of the adjoining ring section, one of which is off-set, are provided with longitudinal grooves 26 for the purpose of alignment and securely locking the same by means of a bolt 27.

In addition to the ribs 16, a stiffener 28 is provided between the two adjoining ribs, one end of which stiffener is swingably attached to an angle 29 secured to the collar 10 near the bottom thereof and the other end is preferably secured by the bolt 27 to the ring 23 at the place of connection of the two adjoining sections 24.

The ring sections 24 preferably do not form a complete circumference and their continuity is interrupted at two diametrically opposite places, one of which is opposite the collar hinge 14 and the other is opposite the open ends of the halves 12 and 13. Connecting bars 31 bridge the gaps between the open sections 24 one end of each bar being swingably retained in a bushing 32 and the other being adapted to be removably secured in a bushing 33. A hinged stiffener 34 is riveted to substantially the middle of the rib 16, the free end of said stiffener being attached to the ring section 24 near the connecting bar 31.

The frame 1 is supported in spaced relation to the ground by a plurality of legs 35 each of which is attached to a pair of the bars 17 and 18.

The frame 1 is covered by a canvas or net cover 2 extending from the outer ring 23 to the collar 10. The cover 2 preferably consists of two halves and includes an outer reinforcing strip 41 near the ring 23, an inner reinforcing strip 42 near the collar 10 and a pair of radial reinforcing strips 43 dividing said cover into two halves. Each reinforcing strip has a plurality of grommets 44 inserted therein for the purpose of providing reinforced openings in said strip through which openings ropes 46 are passed for the purpose of securing said cover to the frame. To connect two halves of the cover together a rope 47 is used which is needled through the grommets 44 and over the edge of the reinforcing strip 43 of one half, and a plurality of hooks 48, attached to the under side of the radial reinforcing strip 43 of the other half, engage the rope 47 at each place where the same passes over the strip's edge. The strips 43 are strung taut between the ring 23 and the collar 10 and represent practically straight lines.

A rope 50 is provided with a toggle 51 for tightening the same over each of the stiffeners 28 which rope raises a ridge in the cover substantially level with the collar. The ridges and the radial reinforcing strips 43 divide the cover 2 into a plurality of the hoppers 3, each of which has an outlet 4 in form of a short sleeve 52. The free end of the sleeve 52 is attached to a ring 53 carried by each rib 16. The cover 2 is well spaced from the metal frame and any fruit falling from the tree on said cover will meet a resilient surface.

Figure 5:
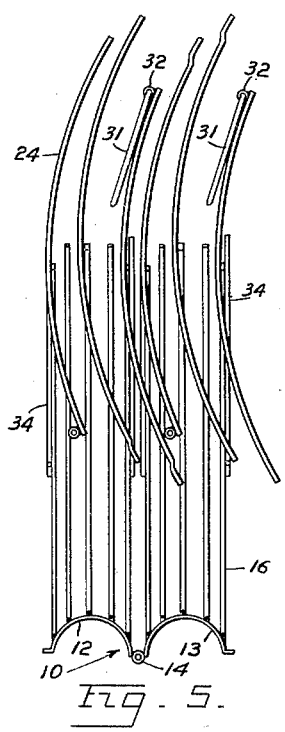
Fig. 5 is a diagrammatic plan view of the frame in folded position.
Figure 9:
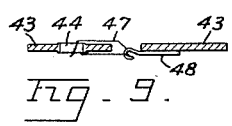
Fig. 9 is a cross-section on the line 9—9 of Fig. 1.
Figure 10:
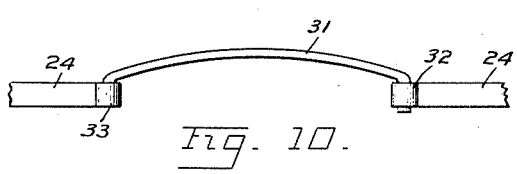
Fig. 10 is a front view of a connecting bar attached to both halves of the ring.
Figure 6:
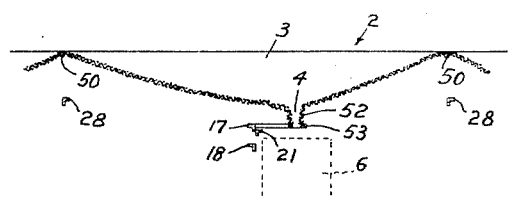
Fig. 6 is a cross-section taken on the line 6—6 of Fig. 1.

The frame 1 may be folded, as shown in Fig. 5. For that purpose the cover 2 is taken off of the frame, the ends of the connecting bars 31 are taken out of the bushings 33, the bolts 27 are unscrewed, the hinged stiffeners 34 are disconnected from the ring 24, and the ring sections are swung in parallel relation to the ribs 16. Thereupon the halves 12 and 13 of the collar 10 as swung open and the ribs 16 and the stiffeners 28 are brought in substantially parallel relation, or in a position wherein the tips of said ribs and stiffeners touch each other.

The frame 1 is preferably made of light metal, such as aluminum alloys, and the ribs 16 and the stiffeners 28 are preferably made out of strips L shaped in cross-section. The cover 2 is preferably made out of netting as the same is lighter than canvas and is more resilient than the latter, and for that reason is better suited to stop the fall of fruit without an injury to the latter.

Having thus described my invention, I claim:

1. A foldable fruit collector comprising a cover consisting of a plurality of radially disposed hoppers each having an outlet at its lowermost portion; a foldable frame supporting said cover consisting of a collar of sufficient size to be placed around a trunk of a fruit tree, said collar consisting of a plurality of hinged sections; an outer ring concentric with the collar and consisting of a plurality of sections detachably attached to each other; a plurality of radial ribs, one end of each rib being hingedly attached to the collar; a pivot bracket on each ring section substantially in the middle thereof; a pivot member connecting the other end of each rib to a corresponding pivot bracket with freedom of swinging thereabout.

2. A foldable fruit collector comprising a cover consisting of a plurality of radially disposed hoppers each having an outlet at its lowermost portion; a foldable frame supporting said cover, said frame including a collar consisting of two hinged sections; an outer ring concentric with the collar and consisting of a plurality of sections detachably attached to each other each section having a pivot bracket fastened to the middle thereof; a plurality of radial ribs arranged between said collar and the ring, each rib consisting of a pair of members hingedly secured to the collar, said members extending from the collar radially, and an outer bar one end of which is affixed to the outer ends of said rib members; a pivot connecting the free end of each outer bar to a corresponding pivot bracket, said pivot permitting the ring section to be swung in relation to the rib to which said ring section is attached; and a leg attached to each of said ribs for supporting said frame in spaced relation to the ground.

WALTER LANGFORD.

REFERENCES CITED

The following references are of record in the file of this patent:

UNITED STATES PATENTS

| Number | Name | Date |
|---|---|---|
| 76,320 | Gage | Apr. 7, 1868 |
| 775,248 | Reid | Nov. 15, 1904 |
| 2,350,908 | Langford | June 6, 1944 |
| 2,436,173 | Knapp | Feb. 17, 1948 |